United States Patent
Huang et al.

(10) Patent No.: US 9,268,415 B2
(45) Date of Patent: Feb. 23, 2016

(54) TOUCH POSITIONING METHOD UTILIZING OPTICAL IDENTIFICATION (OID) TECHNOLOGY, OID POSITIONING SYSTEM AND OID READER

(71) Applicant: Wistron Corporation, New Taipei (TW)

(72) Inventors: Po-Liang Huang, New Taipei (TW); Yu-Yen Chen, New Taipei (TW); Chia-Chang Hou, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/170,525

(22) Filed: Jan. 31, 2014

(65) Prior Publication Data
US 2015/0048155 A1 Feb. 19, 2015

(30) Foreign Application Priority Data
Aug. 13, 2013 (TW) .............................. 102128987 A

(51) Int. Cl.
*G06F 17/00* (2006.01)
*G06F 3/0354* (2013.01)
*G06F 3/03* (2006.01)

(52) U.S. Cl.
CPC .......... *G06F 3/03542* (2013.01); *G06F 3/0321* (2013.01); *G06F 3/03545* (2013.01)

(58) Field of Classification Search
CPC ...... G06K 19/00; G06K 19/063; G06K 19/08
USPC .................. 235/375, 462.01, 494, 462.07
See application file for complete search history.

(56) References Cited

U.S. PATENT DOCUMENTS

| | | | | |
|---|---|---|---|---|
| 5,029,156 | A * | 7/1991 | Kuehnle | 369/126 |
| 5,897,669 | A * | 4/1999 | Matsui | 235/462.07 |
| 6,674,427 | B1 * | 1/2004 | Pettersson et al. | 235/494 |
| 6,729,543 | B1 * | 5/2004 | Arons et al. | 235/462.13 |
| 2010/0133351 | A1* | 6/2010 | Yoshida | 235/494 |
| 2012/0006898 | A1* | 1/2012 | Rezende | 235/472.03 |

* cited by examiner

*Primary Examiner* — Daniel St Cyr
(74) *Attorney, Agent, or Firm* — DLA Piper LLP (US)

(57) ABSTRACT

A touch positioning method is adapted for use on a touch surface of optical identification (OID) technology. The touch surface has thereon multiple positioning marks which define multiple touch areas, and multiple identification patterns, each of which is disposed within a respective touch area and is indicative of a location of the respective touch area. The touch positioning method includes steps of capturing an image of at least one of the touch areas of the touch surface, determining, from among said at least one of the touch areas, a located touch area in which a center point of the image is located, and analyzing the identification pattern which is disposed within the located touch area, so as to obtain the location of the located touch area.

18 Claims, 8 Drawing Sheets

US 9,268,415 B2

TOUCH POSITIONING METHOD UTILIZING OPTICAL IDENTIFICATION (OID) TECHNOLOGY, OID POSITIONING SYSTEM AND OID READER

CROSS-REFERENCE TO RELATED APPLICATION

This application claims priority of Taiwanese Patent Application No. 102128987, filed on Aug. 13, 2013.

BACKGROUND OF THE INVENTION

1. Field of the Invention

The present invention relates to an optical touch positioning method, more particularly to a touch positioning method utilizing optical identification (OID) technology.

2. Description of the Related Art

Optical identification (OID) technology, by means of ink printing, is able to conceal digital information in a printed matter, and by means of an OID reader which combines optical and image processing techniques, the digital information concealed in the printed matter can be read. For example, a conventional reading pen on the market may be used to read an obscure OID code which is concealed in a drawing on a page of a book through the OID printing technique, and to generate a corresponding voice or music indication with reference to the OID code read thereby, so as to achieve educational and entertaining purposes.

SUMMARY OF THE INVENTION

Therefore, in a first aspect of the present invention, a touch positioning method utilizing optical identification (OID) technology is provided.

The touch positioning method for a touch surface of optical identification (OID) technology is to be implemented by an OID positioning system that includes an OID reader. The touch surface has thereon a plurality of positioning marks which cooperatively define a plurality of touch areas, and a plurality of identification patterns, each of which is disposed within a respective one of the touch areas and is distinctly indicative of a location of the respective one of the touch areas on the touch surface. The touch positioning method comprises the steps of:

(A) capturing, using the OID reader, an image of at least one of the touch areas of the touch surface;

(B) from among said at least one of the touch areas contained in the image, determining, using the OID reader, a located touch area in which a center point of the image is located; and (C) analyzing, using the OID reader, the identification pattern which is disposed within the located touch area determined in step (B), so as to obtain the location of the located touch area on the touch surface.

In a second aspect of the invention, an OID positioning system is provided.

The OID positioning system is adapted for performing touch positioning on a touch surface of optical identification technology. The touch surface has thereon a plurality of positioning marks which cooperatively define a plurality of touch areas, and a plurality of identification patterns, each of which is disposed within a respective one of the touch areas and is distinctly indicative of a location of the respective one of the touch areas on the touch surface. The OID positioning system comprising an OID reader which captures an image of at least one of the touch areas of the touch surface, which, from among said at least one of the touch areas contained in the image, determines a located touch area in which a center point of the image is located, and which analyzes the identification pattern that is disposed within the located touch area determined thereby, so as to obtain the location of the located touch area on the touch surface.

In a third aspect of the present invention, an OID reader is provided.

The OID reader is adapted for performing touch positioning on a touch surface of optical identification technology. The touch surface has thereon a plurality of positioning marks which cooperatively define a plurality of touch areas, and a plurality of identification patterns, each of which is disposed within a respective one of the touch areas and is distinctly indicative of a location of the respective one of the touch areas on the touch surface. The OID reader comprises an image capturing unit and an analyzing unit. The image capturing unit captures an image of at least one of the touch areas of the touch surface. The analyzing unit is coupled electrically to the image capturing unit, from among said at least one of the touch areas contained in the image, determines a located touch area in which a center point of the image is located, and analyzes the identification pattern which is disposed within the located touch area determined thereby, so as to obtain the location of the located touch area on the touch surface.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
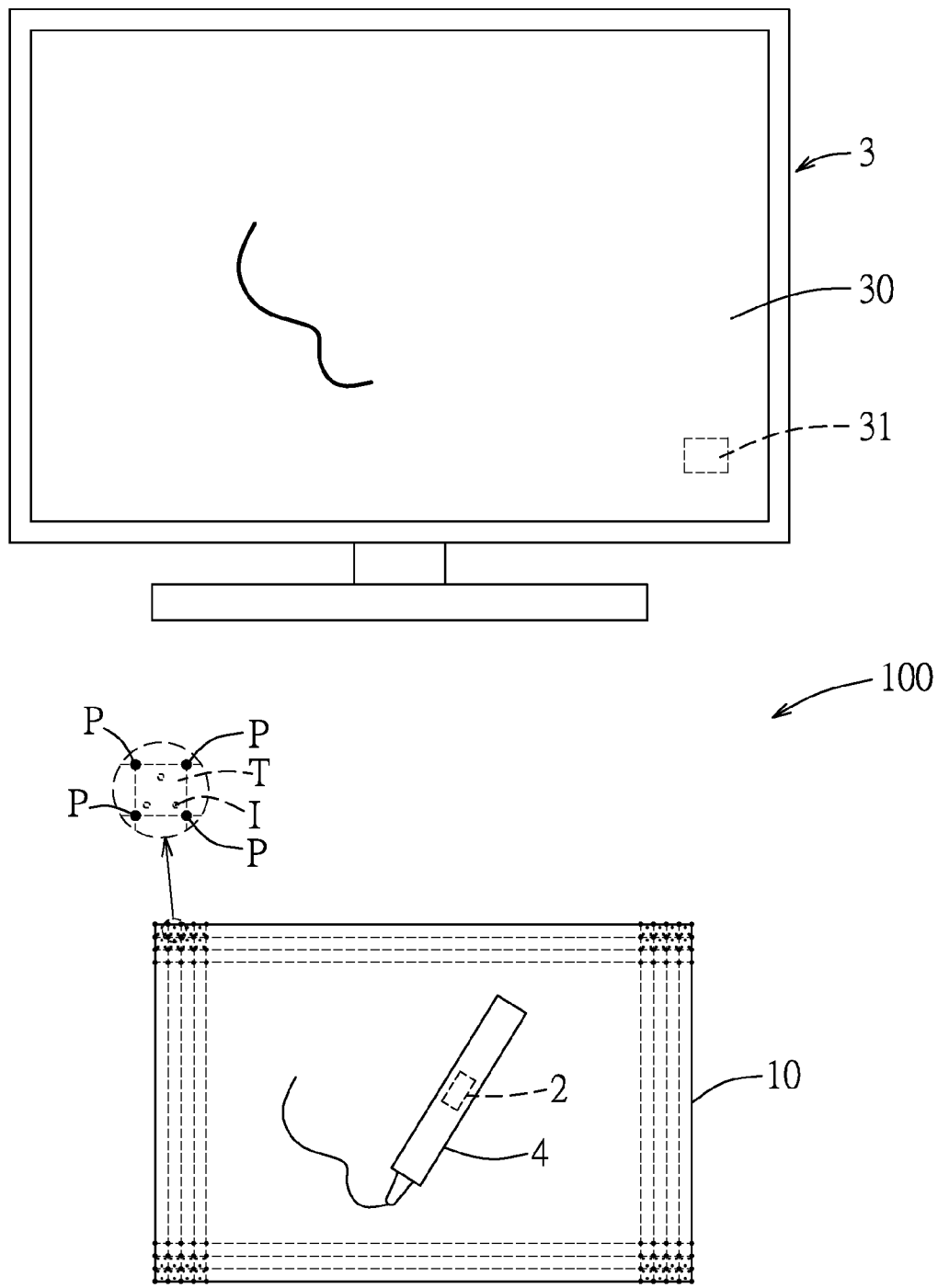
FIG. 1 is a schematic diagram illustrating a preferred embodiment of an optical identification (OID) positioning system according to the present invention.
Figure 2:
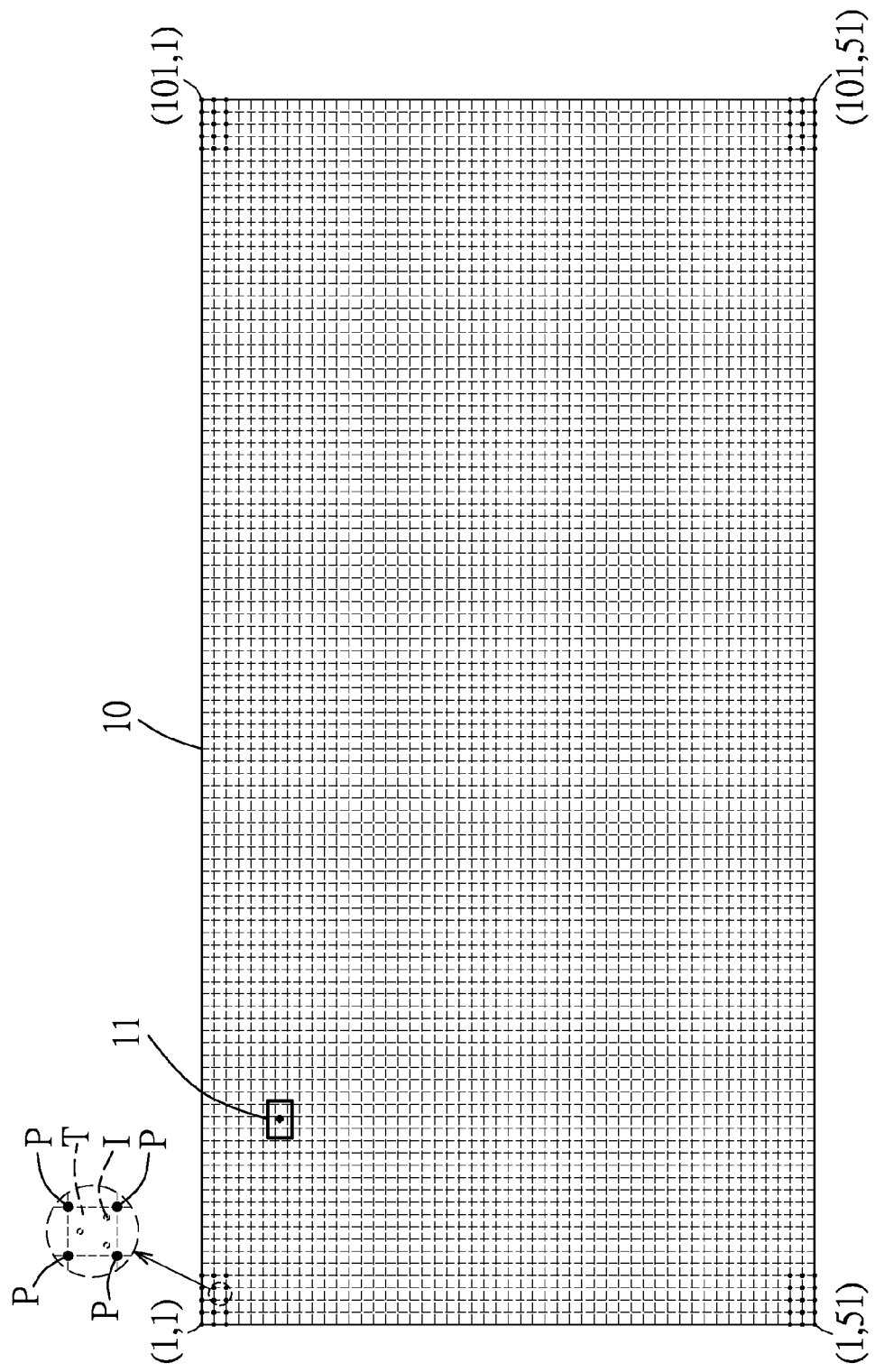
FIG. 2 is a schematic diagram illustrating a touch surface of OID technology.

Referring to FIG. 1, an optical identification (OID) positioning system 100 is adapted for identifying a touch point on a touch surface 10 of OID technology, so as to perform corresponding display or operation. A preferred embodiment of the OID positioning system 100 comprises an OID reader 2 and an electronic device 3. The OID reader 2, in this embodiment, is to be disposed in a pen holder so as to cooperate with the pen holder to form an OID reader pen 4. The OID reader pen 4 may be used to capture an image 11 of the touch surface 10 as illustrated in FIG. 2. The touch surface 10 has thereon a plurality of positioning marks P which are disposed in a matrix arrangement and which cooperatively define a plurality of touch areas T. For example, the touch surface 10 illustrated in FIG. 2 has 100×50 (=5000) touch areas T. The touch surface 10 further has a plurality of identification patterns I, each of which is disposed within a respective one of the touch areas T and is distinctly indicative of a location of the respective one of the touch areas T on the touch surface 10. The identification patterns I are implemented by OID codes in this embodiment, but may be implemented by a different kind of optical code in another configuration. The location of each of the touch areas T is represented by position information of a predetermined one of the positioning marks P, which corporate to define the touch area T. The position information of each of the positioning marks P is associated with a position of the positioning mark P on the touch surface 10. The predetermined one of the positioning marks P, for example, may be the positioning mark P at an upper left-hand corner of the touch area T. For instance, position information of (1, 1) represents the touch area T located at a first row and a first column of the touch surface 10, position information of (1, 2) represents the touch area T located at a second row and the first column of the touch surface 10, and so forth.

The electronic device 3 includes a display 30 and a processing unit 31. Each of the touch surface 10 and the display 30 is rectangular in shape. The processing unit 31 stores in advance four entries of the position information of four of the positioning marks P that are respectively located at four corners of the touch surface 10, i.e., (1, 1), (101, 1), (1, 51) and (101, 51). The processing unit 31 of the electronic device 3 is configured to determine the positioning marks P on the touch surface 10 based on the four entries of the position information (i.e., to determine a "resolution" of the touch surface 10), and to determine a mapping relationship between the positioning marks P on the touch surface 10 and picture elements of the display 30 based on the four entries of the position information and a resolution of the display 30, e.g., 1000 (picture elements)×500 (picture elements). For example, the positioning mark P having the position information of (1, 1) is mapped onto a picture element of the display 30 having a coordinate of (1, 1). The touch area T that has a location represented by the position information of (1, 1) is mapped onto picture elements of the display 30 which have coordinates ranging from 1 to 10 along an x-axis of the display 30 and ranging from 1 to 10 along a y-axis of the display 30, i.e., 10(picture elements)×10(picture elements). Similarly, the positioning mark P having the position information of (100, 1) is mapped onto a picture element of the display 30 having a coordinate of (991, 1). The touch area T that has a location represented by the position information of (100, 1) is mapped onto picture elements of the display 30 which have coordinates ranging from 991 to 1000 along the x-axis of the display 30 and ranging from 1 to 10 along the y-axis of the display 30.

Figure 5:
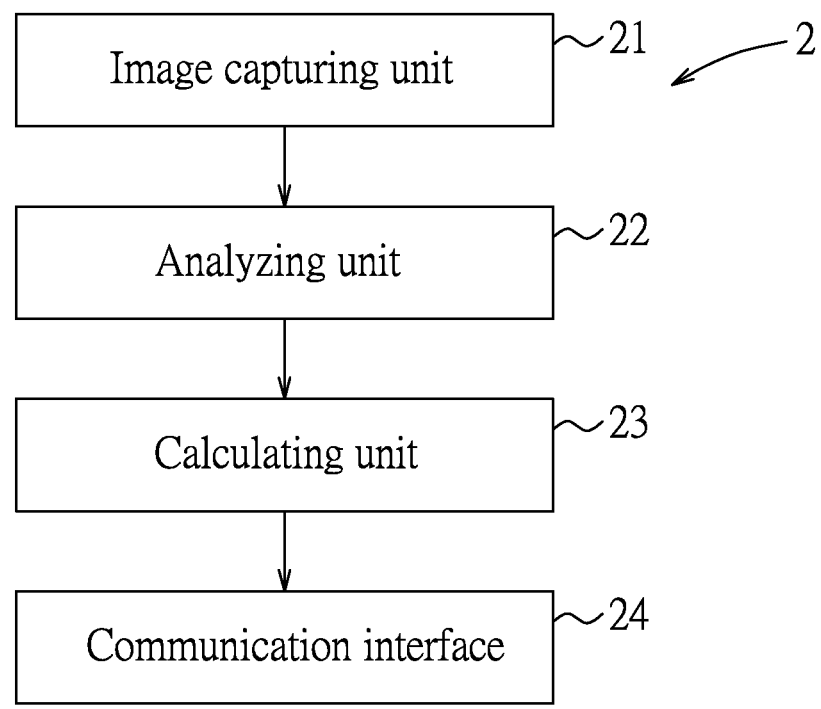
FIG. 5 is a block diagram illustrating a preferred embodiment of an OID reader according to the present invention.

Referring to FIG. 5, the OID reader 2 includes an image capturing unit 21, an analyzing unit 22 coupled electrically to the image capturing unit 21, a calculating unit 23 coupled electrically to the analyzing unit 22, and a communication interface 24 coupled electrically to the calculating unit 23.

Figure 6:
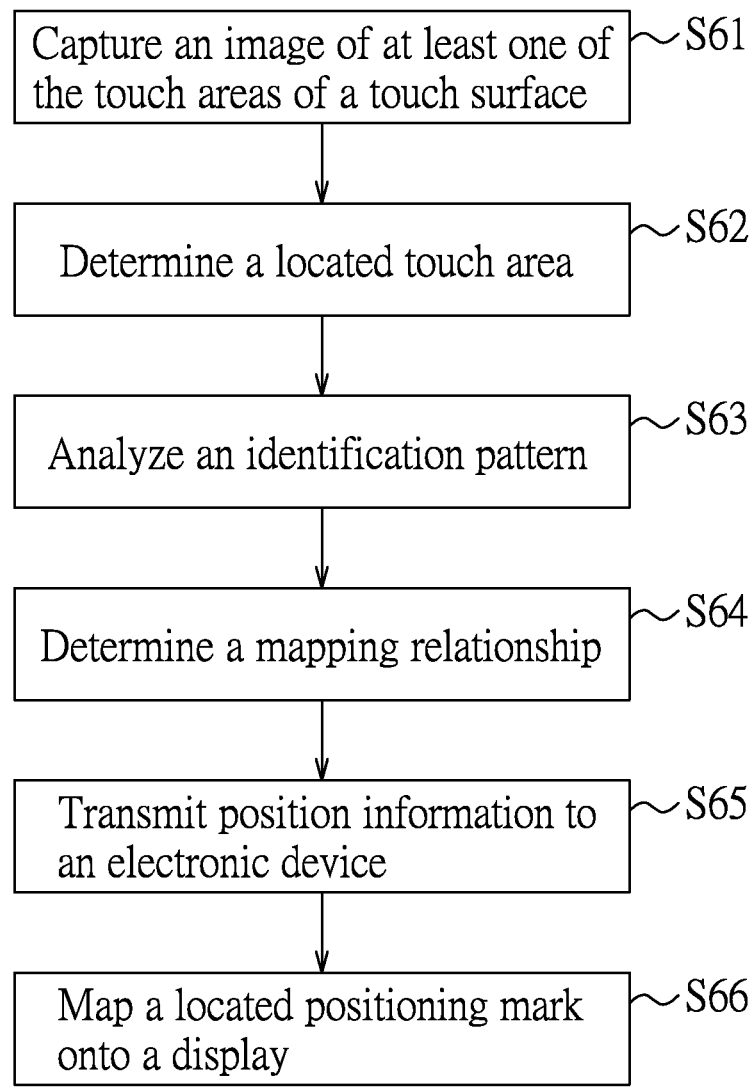
FIG. 6 is a flow chart illustrating a first preferred embodiment of a touch positioning method utilizing OID technology according to the present invention.

Referring to FIG. 6, a first preferred embodiment of a touch positioning method utilizing OID technology according to the present invention is illustrated.

In step S61, when the OID reader pen 4 (see FIG. 1) touches the touch surface 10, the image capturing unit 21, such as a charge-coupled device (CCD) camera, captures an image 11 of at least one of the touch areas T of the touch surface 10. Since a field of view of the image capturing unit 21 is usually greater than an area of four of the touch areas T contained in the image 11, referring to FIG. 8, the image 11 contains a plurality of the positioning marks P which cooperatively define several complete or partial touch areas T. The image capturing unit 21 then provides the image 11 captured thereby to the analyzing unit 22.

In step S62, referring to FIGS. 3, 4, 5 and 8, the analyzing unit 22, from among said at least one of the touch areas T contained in the image 11, determines a located touch area $T_0$ in which a center point C of the image 11 is located.

In step S63, the analyzing unit 22 analyzes the identification pattern I which is disposed within the located touch area $T_0$ determined in step S62, so as to obtain the location of the located touch area $T_0$ on the touch surface 10. That is, the analyzing unit 22 obtains the position information of the predetermined one of the positioning marks P, which cooperatively define the located touch area $T_0$, for example, the position information (20, 15) of the positioning mark $P_0$ that also represents the location of the located touch area $T_0$ on the touch surface 10.

In step S64, the processing unit 31 of the electronic device 3 determines the mapping relationship between the positioning marks P on the touch surface 10 and picture elements of the display 30 based on the four entries of the position information and the resolution of the display 30.

In step S65, the analyzing unit 22 of the OID reader 2 transmits the position information (20, 15) of the positioning mark $P_0$ to the electronic device 3 via the communication interface 24 in one of wired and wireless manners.

Figure 3:
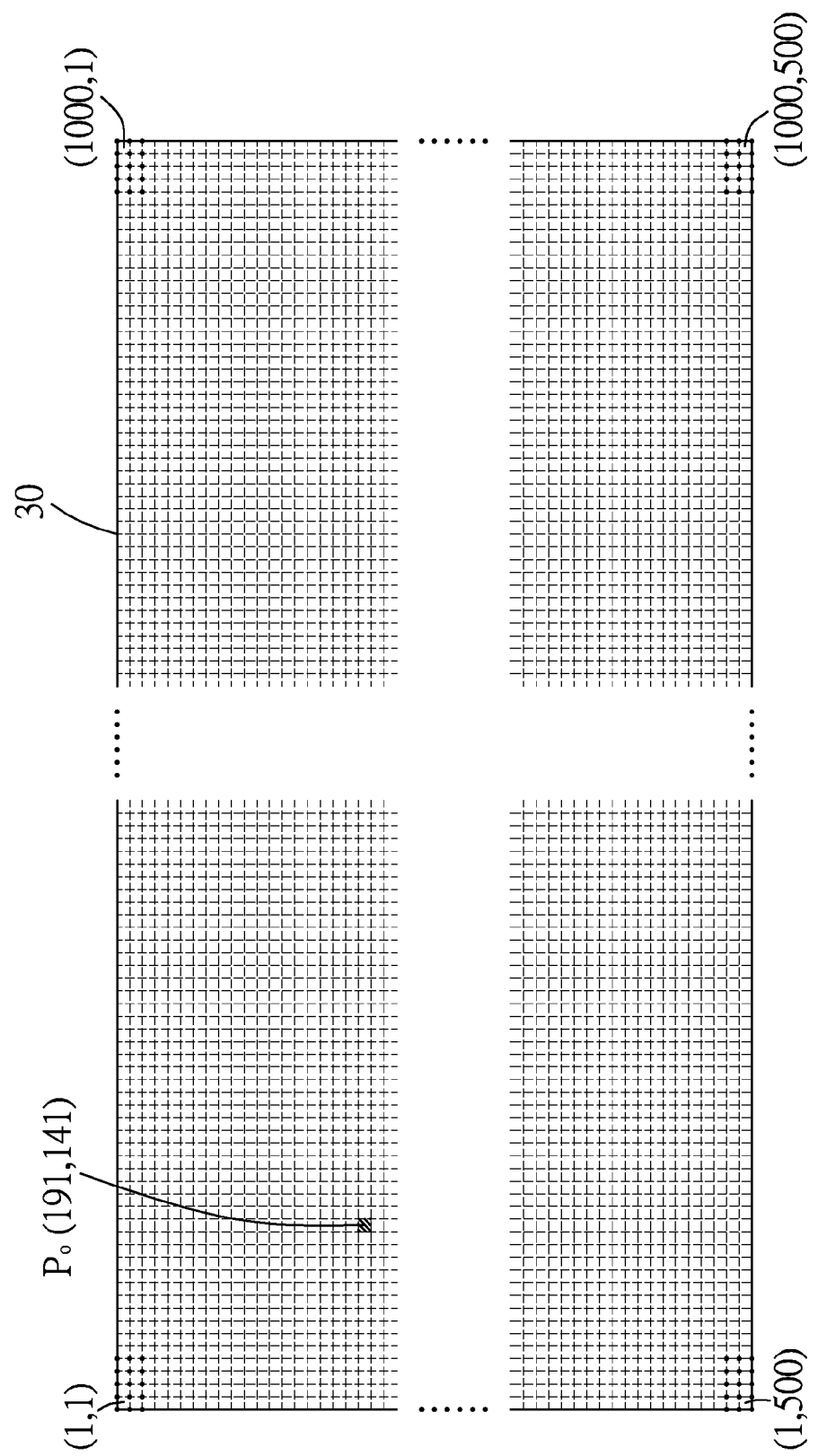
FIG. 3 is a schematic diagram illustrating a resolution of a display of an electronic device in the preferred embodiment.
Figure 4:
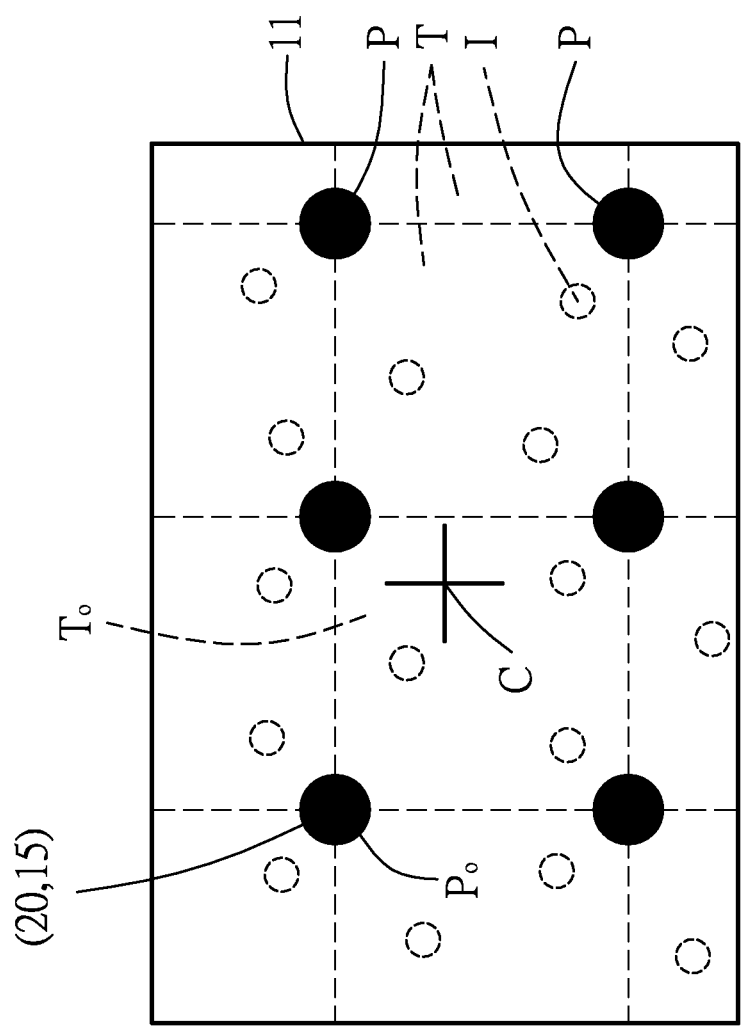
FIG. 4 is a schematic diagram illustrating an image of at least one of a plurality of touch areas on the touch surface.

In step 66, in response to receipt of the position information (20, 15) from the OID reader 2, the electronic device 3 determines a coordinate of one of the picture elements of the display 30, i.e., the picture element having the coordinate of (191, 141) as shown in FIG. 3, with reference to the position information (20, 15) and according to the mapping relationship determined in step S64 so as to map the predetermined one of the positioning marks $P_0$ associated with the located touch area $T_0$ (referred to as a located positioning mark $P_0$ hereinafter) onto the display 30. The electronic device 3 may light up the picture element having the coordinate of (191, 141) on the display 30. Alternatively, the electronic device 3 may perform a corresponding operation according to the coordinate (191, 141) of the picture element of the display 30 determined in step S66, so as to achieve an object of controlling the electronic device 3 by virtue of touching the touch surface 10 with the OID reader pen 4. It is noted that, in this embodiment, the calculating unit 23 may be omitted, and the analyzing unit 22 is coupled electrically and directly to the communication interface 24 for transmitting the position information to the communication interface 24.

In practice, the coordinate (191, 141) of the picture element of the display 30 corresponding to the position information (20, 15) reflects the location of the located touch area $T_0$ on the touch surface 10, and does not reflect a touch position of the OID reader 2 on the touch surface 10. The location of the located touch area $T_0$ is represented by the position information of the predetermined one of the positioning marks P associated with the located touch area $T_0$ (i.e., the located positioning mark $P_0$). Nevertheless, referring to FIG. 4, the center point C of the image 11 is spaced apart from the located positioning mark $P_0$ by a certain distance. Therefore, if the position information of the located positioning mark $P_0$ is adopted to directly represent a location of the center point C of the image 11 with respect to the touch surface 10, the touch position of the OID reader 2 on the touch surface 10 may not be reflected truthfully. Moreover, the distance, with respect to the image 11, between the center point C and the located positioning mark $P_0$ may differ in view of different sizes of the touch areas T on the touch surface 10, i.e., in view of different "resolution" of the touch surface 10. Accordingly, the larger the touch areas T, the more the center point C deviates from the located positioning mark $P_0$.

Consequently, for improving the aforementioned condition of the first preferred embodiment in which the touch position of the OID reader 2 on the touch surface 10 may not be reflected truthfully by the position information of the located positioning mark $P_0$, a second preferred embodiment of the touch positioning method utilizing OID technology according to the present invention which performs further positioning based on the result obtained in the first preferred embodiment is provided.

Figure 7:
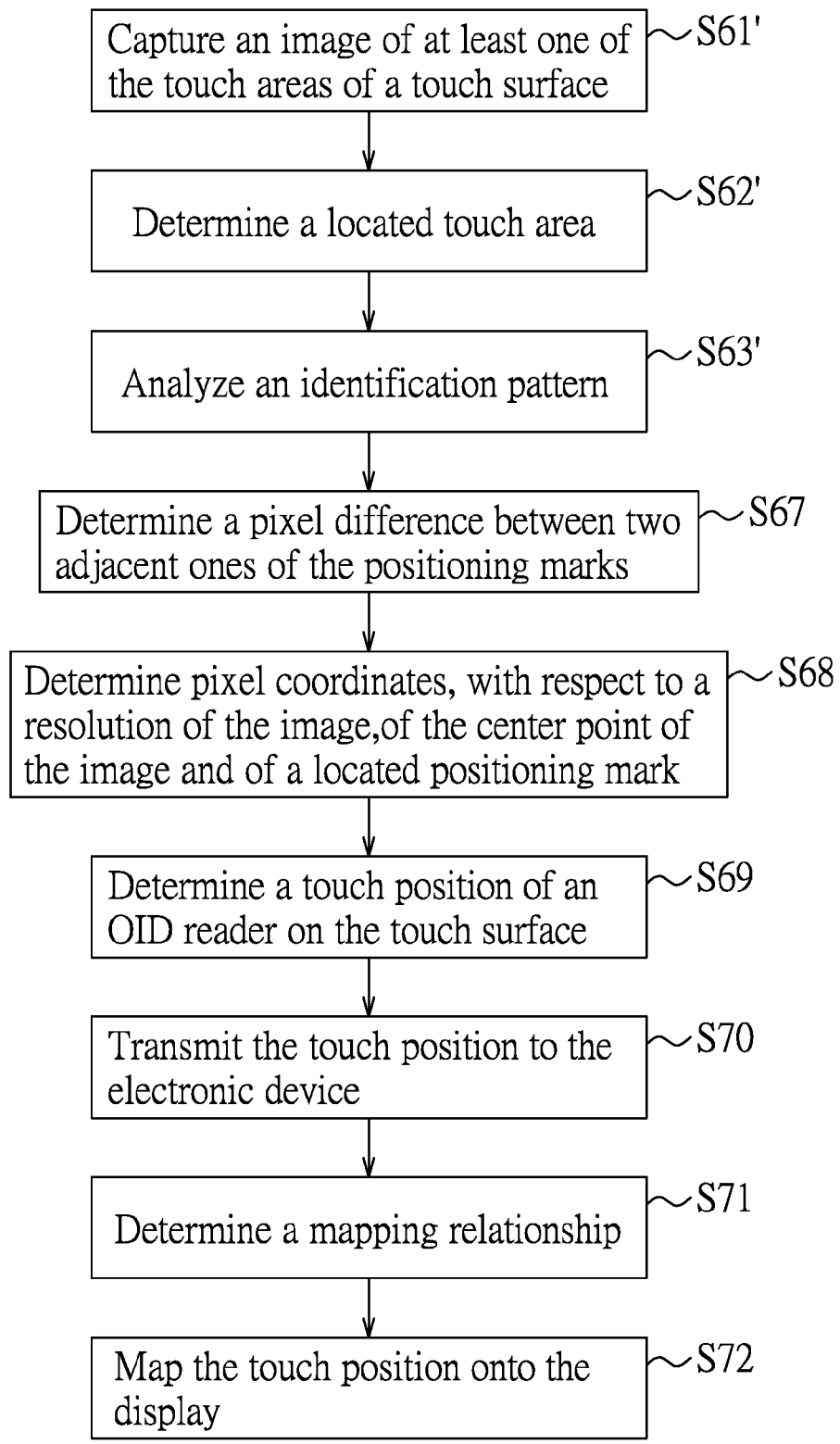
FIG. 7 is a flow chart illustrating a second preferred embodiment of the touch positioning method utilizing OID technology according to the present invention.

Referring to FIG. 7, step S61' to step S63' in the second preferred embodiment are similar to step S61 to step S63 in the first preferred embodiment. Subsequently, the calculating unit 23 determines a distance, with respect to the image 11, between two adjacent ones of the positioning marks P contained in the image 11, and calculates a distance, with respect to the image 11, between the center point C and the located positioning mark $P_0$ in the image 11 according to the distance thus determined between two adjacent ones of the positioning marks P contained in the image 11, and the position information of the located positioning mark $P_0$, so as to obtain the touch position of the OID reader 2 on the touch surface 10.

More specifically, subsequent to step S63', in step S67, the calculating unit 23 is configured to determine a pixel difference between two adjacent ones of the positioning marks P contained in the image 11 with respect to a resolution of the image 11.

In step S68, the calculating unit 23 is configured to determine pixel coordinates, with respect to the resolution of the image 11, of the center point C of the image 11 and of the predetermined one of the positioning marks $P_0$ associated with the located touch area $T_0$.

In step S69, the calculating unit 23 is configured to determine the touch position of the OID reader 2 on the touch surface 10 with reference to the position information obtained in step S63', a position difference between two adjacent ones of the positioning marks P on the touch surface 10, the pixel difference determined in step S67 and the pixel coordinates determined in step S68.

Figure 8:
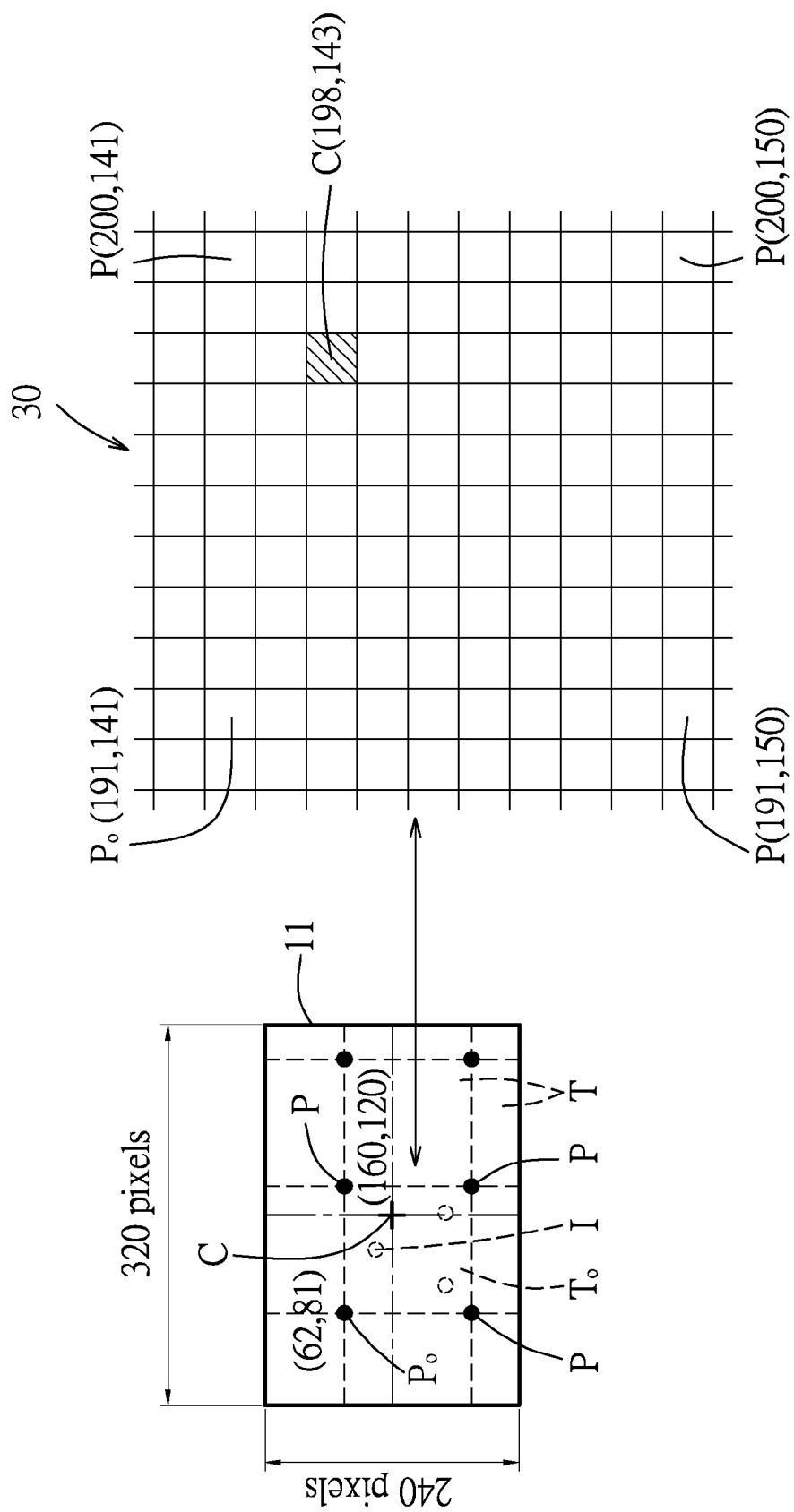
FIG. 8 is a schematic diagram illustrating that a position of the OID reader on the touch surface is mapped onto the display.

For example, referring to FIG. 8, the calculating unit 23 is assumed to recognize that a resolution of the image capturing unit 21 (i.e., a CCD camera) is 320×240 pixels which is also the resolution of the image 11. The calculating unit 23 determines the pixel difference between two adjacent ones of the positioning marks P contained in the image 11 with respect to the resolution of the image 11, e.g., 123 pixels. The calculating unit 23 then determines the pixel coordinates, with respect to the resolution of the image 11, of the center point C of the image 11, e.g., (160, 120) and of the predetermined one of the positioning marks $P_0$ associated with the located touch area $T_0$ (e.g., 62, 81). The calculating unit 23 further calculates a difference between the coordinates (160, 120) and (62, 81), so as to obtain a coordinate difference of (98, 39), with respect to the resolution of the image 11, between the center point C and the located positioning mark $P_0$, that is, a 98-pixel difference therebetween along an x-axis of the image 11, and a 39-pixel difference therebetween along a y-axis of the image 11. Therefore, the touch position of the OID reader 2 on the touch surface 10 may be obtained with reference to the position information (20, 15) of the predetermined one of the positioning marks P associated with the located touch area $T_0$, the position difference between two adjacent ones of the positioning marks P on the touch surface 10, the pixel difference of 123 pixels, and the coordinate difference of (98, 39).

In step S70, the calculating unit 23 of the OID reader 2 transmits the touch position of the OID reader 2 on the touch surface 10 (i.e., the position information (20, 15) of the located positioning mark $P_0$ and the coordinate difference of (98, 39)) to the electronic 3 via the communication interface 24 in one of wired and wireless manners.

The processing unit 31 of the electronic device 3 is configured to execute a positioning software program and performs the following steps.

In step S71, the processing unit 31 determines a mapping relationship between the positioning marks P on the touch surface 10 and the picture elements of the display 30 based on the four entries of the position information and a resolution of the display 30. Each of the touch areas T of the touch surface 10 will correspond to a respective area of the picture elements on the display 30. For example, referring to FIG. 8, the located touch area $T_0$ on the touch surface 10 that has the location represented by the position information of (20, 15) is mapped onto the picture elements of the display 30 which have coordinates ranging from 191 to 200 along the x-axis of the display 30 and ranging from 141 to 150 along the y-axis of the display 30, i.e., defined by coordinates of (191, 141), (200, 141), (191, 150) and (200, 150) of the display 30. That is, each of the touch areas T of the touch surface 10 will correspond to the respective area having 10×10 picture elements on the display 30.

In step S72, in response to receipt of the touch position transmitted by the OID reader 2 in step S70, the processing unit 31 of the electronic device 3 determines a coordinate of one of the picture elements of the display 30 with reference to the touch position and the coordinate difference obtained in step S70 and according to the mapping relationship determined in step S71 so as to map the touch position of the OID reader 2 on the touch surface 10 onto the display 30. More specifically, with reference to the pixel difference between two adjacent ones of the positioning marks P contained in the image 11 with respect to the resolution of the image 11 as determined in step S67, it may be determined that each of the touch areas T contained in the image 11 is constituted by 123×123 pixels with respect to the resolution of the image 11. Therefore, the processing unit 31, through calculation, may determine that a distance of 12.3 pixels in the image 11 corresponds to one picture element of the display 30, i.e., 123 pixels/10 picture elements. Accordingly, the processing unit 31 may determine that the coordinate difference of (98, 39) with respect to the resolution of the image 11 obtained in step S69 substantially corresponds to a difference of picture elements of (8, 3) on the display 30, i.e., 98/12.3=7.97 (approximated to be 8), and 39/12.3=3.17 (approximated to be 3). Consequently, the coordinate of the picture element of the display 30 which corresponds to the touch position of the OID reader 2 on the touch surface 10 is (198, 143), i.e., 7 picture elements to the right from the coordinate (191, 141) along the x-axis of the display 30 and 2 elements down from the coordinate (198, 141) along the y-axis of the display 30. The electronic device 3 may light up the picture element having the coordinate of (198, 143) on the display 30 which more accurately reflect the touch position of the OID reader 2 on the touch surface 10. Alternatively, the electronic device 3 may perform a corresponding operation (198, 143) according to the coordinate of the picture element of the display 3.

Furthermore, in an alternative configuration of the second preferred embodiment, subsequent to step S63', the calculating unit 23 of the OID reader 2 is configured to determine mark distances which are distances, with respect to the image 11, between two adjacent ones of the positioning marks P contained in the image 11 respectively along the x-axis and the y-axis of the image 11. The calculating unit 23 further determines a point distance which is a distance, with respect to the image 11, between the center point C and the predetermined one of the positioning marks $P_0$ associated with the located touch area $T_0$ along the x-axis of the image 11, and a point distance which is a distance, with respect to the image 11, between the center point C and the predetermined one of the positioning marks $P_0$ associated with the located touch area $T_0$ along the y-axis of the image 11. The calculating unit 23 then calculates a ratio of the mark distance determined thereby along the x-axis to the point distance determined thereby along the x-axis (e.g., 80%), and a ratio of the mark distance determined thereby along the y-axis to the point distance determined thereby along the y-axis (e.g., 30%). The calculating unit 23 finally determines the touch position of the OID reader 2 on the touch surface 10 with reference to the position information of the predetermined one of the positioning marks $P_0$ associated with the located touch area $T_0$ obtained thereby (e.g., (20, 15)), a position difference between two adjacent ones of the positioning marks P on the touch surface 10, and the ratios determined thereby (i.e., 80% and 30%). The calculating unit 23 transmits to the electronic device 3 the position of the OID reader 2 on the touch surface 10 determined thereby via the communication interface 24.

Similarly, in the alternative configuration of the second preferred embodiment, in response to receipt of the touch position transmitted by the OID reader 2, the processing unit 31 of the electronic device 3 determines a coordinate of one of the picture elements of the display 30 with reference to the touch position received from the OID reader 2 and according to the mapping relationship determined thereby so as to map the touch position of the OID reader 2 on the touch surface 10 onto the display 30. For example, the processing 31 may determine that the coordinate of the picture element of the display 30 which corresponds to the touch position of the OID reader 2 on the touch surface 10 is the eighth picture elements (10×80%=8 picture elements) beginning from (191, 141) along the x-axis of the display 30, i.e., 7 picture elements away from the coordinate (191, 141) along the x-axis of the display 30 and the third picture elements (10×30%=3 picture elements) beginning from (198, 141) along the y-axis of the display 30, i.e., 2 elements away from the coordinate (198, 141) along the y-axis of the display 30, so as to map the touch position of the OID reader 2 on the touch surface 10 onto the picture element having coordinate of (198, 143) of the display 30.

In summary, the OID positioning system 100 of the present invention is able to perform coarse positioning, i.e., the first preferred embodiment of the touch positioning method of this invention, in which a coordinate of one of the picture elements of the display 30 is determined so as to map the predetermined one of the positioning marks $P_0$ associated with the located touch area $T_0$ onto the display 30. Moreover, the OID positioning system 100 may further perform fine positioning, i.e., the second preferred embodiment of the touch positioning method of this invention, in which a coordinate of one of the picture elements of the display 30 is determined so as to map the touch position of the OID reader 2 on the touch surface 10 onto the display 30.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A touch positioning method for a touch surface of optical identification (OID) technology to be implemented by an OID positioning system that includes an OID reader, the touch surface having thereon a plurality of positioning marks which cooperatively define a plurality of touch areas, and a plurality of identification patterns, each of which is disposed within a respective one of the touch areas and is distinctly indicative of a location of the respective one of the touch areas on the touch surface, the touch positioning method comprising the steps of:
   (A) capturing, using the OID reader, an image of at least one of the touch areas of the touch surface;
   (B) from among said at least one of the touch areas contained in the image, determining, using the OID reader, a located touch area in which a center point of the image is located; and
   (C) analyzing, using the OID reader, the identification pattern which is disposed within the located touch area determined in step (B) and which contains position information associated with one of the positioning marks that cooperatively define the located touch area, so as to obtain the location of the located touch area on the touch surface.

2. The touch positioning method as claimed in claim 1, wherein the location of each of the touch areas is represented by position information of a predetermined one of the positioning marks, which corporate to define the touch area, the position information of each of the positioning marks being associated with a position of the positioning mark on the touch surface; and
   in step (C), the OID reader analyzes the identification pattern to obtain the position information of the predetermined one of the positioning marks that cooperatively define the located touch area.

3. The touch positioning method as claimed in claim 2, the touch surface being rectangular in shape, the OID positioning system further including an electronic device that includes a display, which is rectangular in shape, the electronic device storing four entries of the position information of four of the positioning marks that are respectively located at four corners of the touch surface, the optical touch positioning method further comprising the steps of:
   (D) determining, using the electronic device, a mapping relationship between the positioning marks on the touch surface and picture elements of the display based on the four entries of the position information and a resolution of the display;
   (E) transmitting to the electronic device, using the OID reader, the position information of the predetermined one of the positioning marks that cooperatively define the located touch area obtained in step (C); and
   (F) in response to receipt of the position information from the OID reader in step (E), determining, using the electronic device, a coordinate of one of the picture elements of the display with reference to the position information and according to the mapping relationship determined in step (D) so as to map the predetermined one of the positioning marks associated with the located touch area onto the display.

4. The touch positioning method as claimed in claim 2, further comprising the steps of:
   (G) determining, using the OID reader, a pixel difference between two adjacent ones of the positioning marks contained in the image with respect to a resolution of the image;
   (H) determining, using the OID reader, pixel coordinates, with respect to the resolution of the image, of the center point of the image and of the predetermined one of the positioning marks associated with the located touch area; and (I) determining a touch position of the OID reader on the touch surface with reference to the position information obtained in step (C), a position difference between two adjacent ones of the positioning marks on the touch surface, the pixel difference determined in step (G) and the pixel coordinates determined in step (H).

5. The touch positioning method as claimed in claim 2, further comprising the steps of:

(J) determining, using the OID reader, distances, with respect to the image, between two adjacent ones of the positioning marks contained in the image respectively along an x-axis and a y-axis of the image;

(K) determining a distance, with respect to the image, between the center point and the predetermined one of the positioning marks associated with the located touch area along the x-axis, and a distance, with respect to the image, between the center point and the predetermined one of the positioning marks associated with the located touch area along the y-axis;

(L) calculating a ratio of the distance determined in step (J) along the x-axis to the distance determined in step (K) along the x-axis, and a ratio of the distance determined in step (J) along the y-axis to the distance determined in step (K) along the y-axis; and (M) determining a touch position of the OID reader on the touch surface with reference to the position information of the predetermined one of the positioning marks associated with the located touch area obtained in step (C), a position difference between two adjacent ones of the positioning marks on the touch surface, and the ratios determined in step (L).

6. The touch positioning method as claimed in claim 5, the touch surface being rectangular in shape, the OID positioning system further including an electronic device that includes a display, which is rectangular in shape, the electronic device storing four entries of the position information of four of the positioning marks that are respectively located at four corners of the touch surface, the touch positioning method further comprising the steps of:

(N) determining, using the electronic device, a mapping relationship between the positioning marks on the touch surface and picture elements of the display based on the four entries of the position information and a resolution of the display;

(O) transmitting to the electronic device, using the OID reader, the touch position of the OID reader on the touch surface determined in step (M); and (P) in response to receipt of the touch position transmitted by the OID reader in step (O), determining, using the electronic device, a coordinate of one of the picture elements of the display with reference to the touch position obtained in step (O) and according to the mapping relationship determined in step (N) so as to map the touch position of the OID reader on the touch surface onto the display.

7. An OID positioning system adapted for performing touch positioning on a touch surface of optical identification (OID) technology, the touch surface having thereon a plurality of positioning marks which cooperatively define a plurality of touch areas, and a plurality of identification patterns, each of which is disposed within a respective one of the touch areas and is distinctly indicative of a location of the respective one of the touch areas on the touch surface, said OID positioning system comprising an OID reader which:

captures an image of at least one of the touch areas of the touch surface;

from among said at least one of the touch areas contained in the image, determines a located touch area in which a center point of the image is located; and analyzes the identification pattern that is disposed within the located touch area determined thereby and that contains position information associated with one of the positioning marks which cooperatively define the located touch area, so as to obtain the location of the located touch area on the touch surface.

8. The OID positioning system as claimed in claim 7, wherein the location of each of the touch areas is represented by position information of a predetermined one of the positioning marks, which corporate to define the touch area, the position information of each of the positioning marks being associated with a position of the positioning mark on the touch surface; and wherein said OID reader analyzes the identification pattern to obtain the position information of the predetermined one of the positioning marks that cooperatively define the located touch area.

9. The OID positioning system as claimed in claim 8, the touch surface being rectangular in shape, said OID positioning system further comprising:

an electronic device that includes a display, which is rectangular in shape and which has a plurality of picture elements, said electronic device storing four entries of the position information of four of the positioning marks that are respectively located at four corners of the touch surface;

wherein said electronic device determines a mapping relationship between the positioning marks on the touch surface and said picture elements of said display based on the four entries of the position information and a resolution of said display;

wherein said OID reader transmits to said electronic device the position information of the predetermined one of the positioning marks that cooperatively define the located touch area; and wherein, in response to receipt of the position information from the OID reader, said electronic device determines a coordinate of one of said picture elements of said display with reference to the position information and according to the mapping relationship determined thereby so as to map the predetermined one of the positioning marks associated with the located touch area onto said display.

10. The OID positioning system as claimed in claim 8, wherein said OID reader is configured to:

determine a pixel difference between two adjacent ones of the positioning marks contained in the image with respect to a resolution of the image;

determine pixel coordinates, with respect to the resolution of the image, of the center point of the image and of the predetermined one of the positioning marks associated with the located touch area; and determine a touch position of said OID reader on the touch surface with reference to the position information obtained thereby, a position difference between two adjacent ones of the positioning marks on the touch surface, the pixel difference determined thereby and the pixel coordinates determined thereby.

11. The OID positioning system as claimed in claim 8, wherein said OID reader is configured to:

determine mark distances which are distances, with respect to the image, between two adjacent ones of the positioning marks contained in the image respectively along an x-axis and a y-axis of the image;

determine a point distance which is a distance, with respect to the image, between the center point and the predetermined one of the positioning marks associated with the located touch area along the x-axis, and a point distance which is a distance, with respect to the image, between the center point and the predetermined one of the positioning marks associated with the located touch area along the y-axis;

calculate a ratio of the mark distance determined thereby along the x-axis to the point distance determined thereby along the x-axis, and a ratio of the mark distance determined thereby along the y-axis to the point distance determined thereby along the y-axis; and determine a touch position of said OID reader on the touch surface with reference to the position information of the predetermined one of the positioning marks associated with the located touch area obtained thereby, a position difference between two adjacent ones of the positioning marks on the touch surface and the ratios determined thereby.

12. The OID positioning system as claimed in claim 11, the touch surface being rectangular in shape, said OID positioning system further comprising:

an electronic device that includes a display, which is rectangular in shape and which includes a plurality of picture elements, said electronic device storing four entries of the position information of four of the positioning marks that are respectively located at four corners of the touch surface;

wherein said electronic device determines a mapping relationship between the positioning marks on the touch surface and said picture elements of said display based on the four entries of the position information and a resolution of said display;

wherein said OID reader transmits to said electronic device the touch position of said OID reader on the touch surface determined thereby; and wherein, in response to receipt of the touch position transmitted by said OID reader, said electronic device determines a coordinate of one of said picture elements of said display with reference to the touch position received from said OID reader and according to the mapping relationship determined thereby so as to map the touch position of said OID reader on the touch surface onto said display.

13. An OID reader adapted for performing touch positioning on a touch surface of optical identification technology, the touch surface having thereon a plurality of positioning marks which cooperatively define a plurality of touch areas, and a plurality of identification patterns, each of which is disposed within a respective one of the touch areas and is distinctly indicative of a location of the respective one of the touch areas on the touch surface, said OID reader comprising:

an image capturing unit that captures an image of at least one of the touch areas of the touch surface; and an analyzing unit that is coupled electrically to said image capturing unit, that, from among said at least one of the touch areas contained in the image, determines a located touch area in which a center point of the image is located, and that analyzes the identification pattern which is disposed within the located touch area determined thereby and which contains position information associated with one of the positioning marks that cooperatively define the located touch area, so as to obtain the location of the located touch area on the touch surface.

14. The OID reader as claimed in claim 13, wherein the location of each of the touch areas is represented by position information of a predetermined one of the positioning marks, which corporate to define the touch area, the position information of each of the positioning marks being associated with a position of the positioning mark on the touch surface; and wherein said analyzing unit analyzes the identification pattern to obtain the position information of the predetermined one of the positioning marks that cooperatively define the located touch area.

15. The OID reader as claimed in claim 14, further comprising a calculating unit that is coupled electrically to said analyzing unit, wherein said calculating unit is configured to:

determine a pixel difference between two adjacent ones of the positioning marks contained in the image with respect to a resolution of the image;

determine pixel coordinates, with respect to the resolution of the image, of the center point of the image and of the predetermined one of the positioning marks associated with the located touch area; and determine a touch position of said OID reader on the touch surface with reference to the position information obtained thereby, a position difference between two adjacent ones of the positioning marks on the touch surface, the pixel difference determined thereby and the pixel coordinates determined thereby.

16. The OID positioning system as claimed in claim 14, further comprising a calculating unit that is coupled electrically to said analyzing unit, wherein said calculating unit is configured to:

determine mark distances which are distances, with respect to the image, between two adjacent ones of the positioning marks contained in the image respectively along an x-axis and a y-axis of the image;

determine a point distance which is a distance, with respect to the image, between the center point and the predetermined one of the positioning marks associated with the located touch area along the x-axis, and a point distance which is a distance, with respect to the image, between the center point and the predetermined one of the positioning marks associated with the located touch area along the y-axis;

calculate a ratio of the mark distance determined thereby along the x-axis to the point distance determined thereby along the x-axis, and a ratio of the mark distance determined thereby along the y-axis to the point distance determined thereby along the y-axis; and determine a touch position of said OID reader on the touch surface with reference to the position information of the predetermined one of the positioning marks associated with the located touch area obtained thereby, a position difference between two adjacent ones of the positioning marks on the touch surface and the ratios determined thereby.

17. The OID reader as claimed in claim 14, further comprising a communication interface that is coupled electrically to said calculating unit for wiredly transmitting the position information of the predetermined one of the positioning marks that cooperatively define the located touch area.

18. The OID reader as claimed in claim 14, further comprising a communication interface that is coupled electrically to said calculating unit for wirelessly transmitting the position information of the predetermined one of the positioning marks that cooperatively define the located touch area.

* * * * *